(12) United States Patent
Smith et al.

(10) Patent No.: US 8,319,700 B2
(45) Date of Patent: Nov. 27, 2012

(54) MULTIPLE-DISPLAY DEVICE

(75) Inventors: Martin R. Smith, Dundee (GB);
Michael N. McKenna, Dundee (GB)

(73) Assignee: NCR Corporation, Duluth, GA (US)

( * ) Notice: Subject to any disclaimer, the term of this patent is extended or adjusted under 35 U.S.C. 154(b) by 825 days.

(21) Appl. No.: 12/491,885

(22) Filed: Jun. 25, 2009

(65) Prior Publication Data
US 2010/0328191 A1 Dec. 30, 2010

(51) Int. Cl.
*G09G 5/00* (2006.01)
(52) U.S. Cl. .......................................... 345/1.2; 715/769
(58) Field of Classification Search ............ 345/1.1–3.4; 715/769
See application file for complete search history.

(56) References Cited

U.S. PATENT DOCUMENTS

2009/0131117 A1* 5/2009 Choi .............................. 455/566
2009/0164930 A1* 6/2009 Chen et al. ..................... 715/769

* cited by examiner

*Primary Examiner* — Jimmy H Nguyen
(74) *Attorney, Agent, or Firm* — NCR Corporation

(57) ABSTRACT

A multiple-display device comprises a front and a rear display. The front display includes a front image area facing a front direction. The rear display is mounted opposite the front display and includes a rear image area facing a rear direction, opposite the front direction. A display controller is provided for controlling the front and rear image areas to render images thereon, including a transfer port image on the front image area. A touch-sensitive panel is mounted on the front display in registration with the front image area. A panel controller is operable to detect a rendered element on the front image area being dragged by a user to the transfer port image and in response thereto to inform the display controller, so that the display controller can instantiate the rendered element on the rear image area.

15 Claims, 3 Drawing Sheets

MULTIPLE-DISPLAY DEVICE

FIELD OF INVENTION

The present invention relates to a multiple-display device.

BACKGROUND OF INVENTION

It is possible to have two flat-panels, touch sensitive, displays configured back-to-back in a single device so that the front of the device presents one user interface, and the rear of the device presents another user interface. As used herein, a user interface refers to the text, images, and controls rendered on the display by software. In other words, the user interface comprises software-configurable elements rendered on hardware (the display).

It may not be intuitive for some people to use a multi-sided display, particularly if programs or data are to be transferred from the front display to the rear display, or vice versa.

SUMMARY OF INVENTION

Accordingly, the invention generally provides methods, systems, apparatus, and software for a user interface for a multi-sided display.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a multiple-display device comprising: a front display including a front image area facing a front direction; a rear display mounted opposite the front display and including a rear image area facing a rear direction, opposite the front direction; a display controller for controlling the front and rear image areas to render images thereon, including a transfer port image on the front image area; a touch-sensitive panel mounted on the front display in registration with the front image area; and a panel controller operable to detect a rendered element on the front image area being dragged by a user to the transfer port image and in response thereto to inform the display controller, so that the display controller can instantiate the rendered element on the rear image area.

The multiple-display device may further comprise third and fourth displays mounted back to back, so that the front, rear, third, and fourth displays form a square.

The rendered element may be an image (for example, an icon representing a file or an application), text, a control (for example, battery status, a clock, signal level for wireless communication, or the like), or the like.

The display controller may enlarge the transfer port and/or the rendered element as the rendered element approaches the transfer port.

The transfer port image may comprise any convenient image, for example, a representation of a black hole.

The transfer port image may be located on any convenient portion of the image area. For example, any one or any combination of the following locations could be used for the transfer port image: top left corner, top right corner, bottom left corner, bottom right corner, left hand side, and/or right hand side.

The rear image area may include a rear transfer port image corresponding to the front transfer port image.

The display controller may provide a sequence of images illustrating the rendered element entering the front transfer port image, and subsequently exiting the rear transfer port image, so that if a user flips over the device, he/she can see the rendered image emerging from the rear transfer port image.

The rear display may include a touch-sensitive panel in addition to the front display.

Where the rendered element is an image or text, the display controller may instantiate the rendered element on the rear image area by presenting the image or text. Where the rendered element is an icon associated with an application, the display controller may instantiate the rendered element on the rear image area by launching the application associated with the icon.

According to a second aspect there is provided a method of operating a device comprising multiple displays, the method comprising: rendering a transfer port image on a front image area of a front display; rendering one or more elements on the front image area; detecting a user selecting a rendered element and moving the selected rendered element to the transfer port image; informing a display controller that the selected rendered element has been moved to the transfer port image; and instantiating the selected rendered element on a rear image area of a rear display instead of on the front image area of the front display.

The method may further comprise, subsequent to the step of detecting a user selecting a rendered element and moving the selected rendered element to the transfer port image, the step of enlarging the transfer port image on the front image area.

Alternatively or additionally, the method may further comprise enlarging the selected rendered element on the front image area as the selected rendered element approaches the transfer port image.

The method may further comprise providing a rear transfer port on the rear image area.

The method may further comprise providing a sequence of images illustrating the selected rendered element entering the front transfer port image, and subsequently exiting the rear transfer port image, so that if a user flips over the device, he/she can see the rendered image emerging from the rear transfer port image.

The step of instantiating the selected rendered element on a rear image area of a rear display instead of on the front image area of the front display may be implemented immediately the rendered element is dragged to the transfer port, or alternatively, only when a user flips over the device. Detection of the device flipping may be implemented using an accelerometer located within the device.

The method may further comprise: detecting a user selecting a rendered element on the rear image area and moving the selected rendered element to the rear transfer port image; informing the display controller that the selected rendered element has been moved to the rear transfer port image; and instantiating the selected rendered element on the front image area instead of on the rear image area.

By virtue of this aspect, a user can move an image or text to a display on an opposite side of a device, or launch an application on the opposite side of the device, merely by moving the image, text, or application to the transfer port image. This facilitates ease of use of a multiple display device.

These and other aspects will be apparent from the following specific description, given by way of example, with reference to the accompanying drawings.

DETAILED DESCRIPTION

Figure 1:
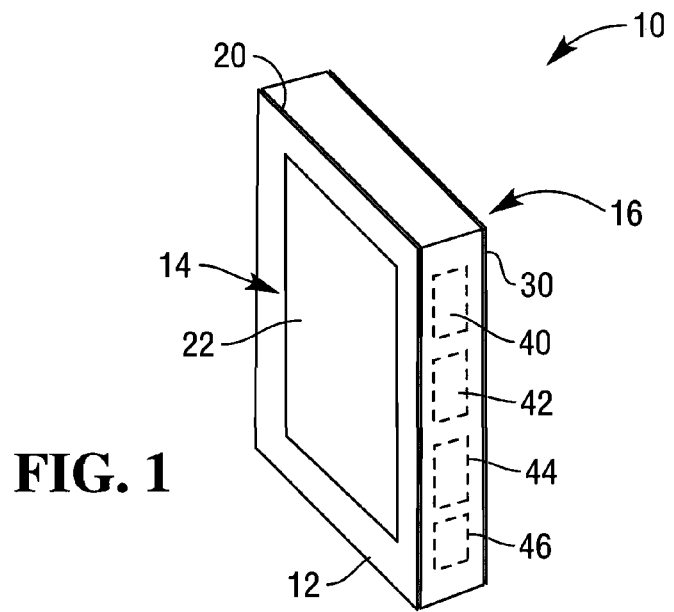
FIG. 1 is a schematic diagram of a portable, multiple-display device according to one embodiment of the present invention.

Reference is first made to FIG. 1, which is a simplified front, schematic diagram of a portable, multiple-display device 10 according to one embodiment of the present invention. The device 10 comprises a housing 12 enclosing a front display 14 and a rear display 16 (not visible in FIG. 1) mounted back-to-back so that a user can view either the front display 14 or flip the device 10 and view the rear display 16.

The device 10 further comprises a transparent, touch-sensitive panel 20 mounted on the front display 14 and in registration with a front image area 22 on which graphical elements can be rendered.

Similarly, but not clearly visible on FIG. 1, the device 10 further comprises a transparent, touch-sensitive panel 30 mounted on the rear display 16 and in registration with a rear image area (not shown in FIG. 1) on which graphical elements can be rendered.

Mounted within the housing 12 is a display controller 40, a touch panel controller 42, a device controller 44, and an accelerometer 46. The display controller 40 is arranged for controlling both the front image area 22 and the rear image area (not shown in FIG. 1). The display controller 40 is responsible for rendering images on the front and rear displays 14,16.

The touch panel controller 42 detects a touch on the front and/or rear touch-sensitive panel 20,30 and conveys the co-ordinates of this touch point to the device controller 44, which updates the display controller 40 as necessary, as will be described in more below.

Figure 2:
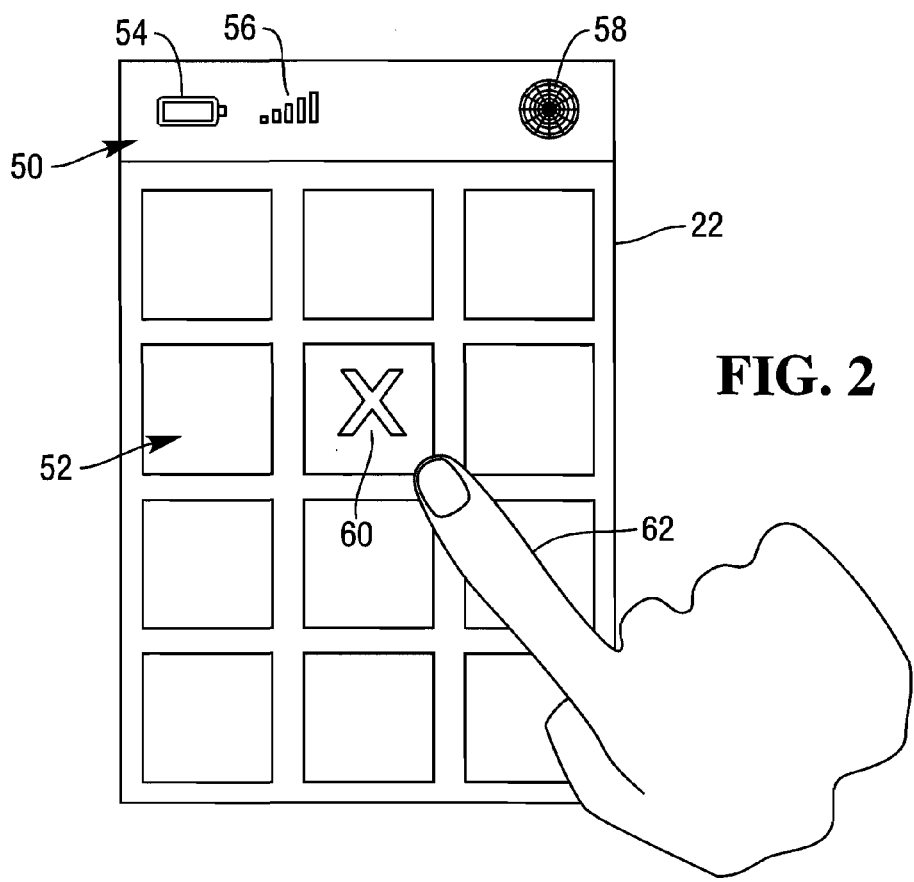
FIG. 2 is a pictorial view of a front image area of the device of FIG. 1 illustrating a rendered element and a front transfer port image.

Reference will now also be made to FIG. 2, which is a pictorial view of the front image area 22 of the device 10.

The front image area 22 comprises a control portion 50 near the top of the front image area 22 and a working portion 52 beneath the control portion 50.

The control portion 50 includes a battery icon 54 indicating an amount of battery life remaining in the device 10, a signal icon 56 representing a wireless signal strength (for either a cellular radiofrequency telephone system or a wireless network system (WiFi)), and a transfer port image 58 in the form of an icon of a black hole.

The working portion 52 can be used to display files, text, and the like, and includes a graphical element 60 rendered on the display 14.

Graphical elements on the control portion 50 and working portion 52 can be selected by a user's finger 62 touching the desired graphical element.

Figure 3:
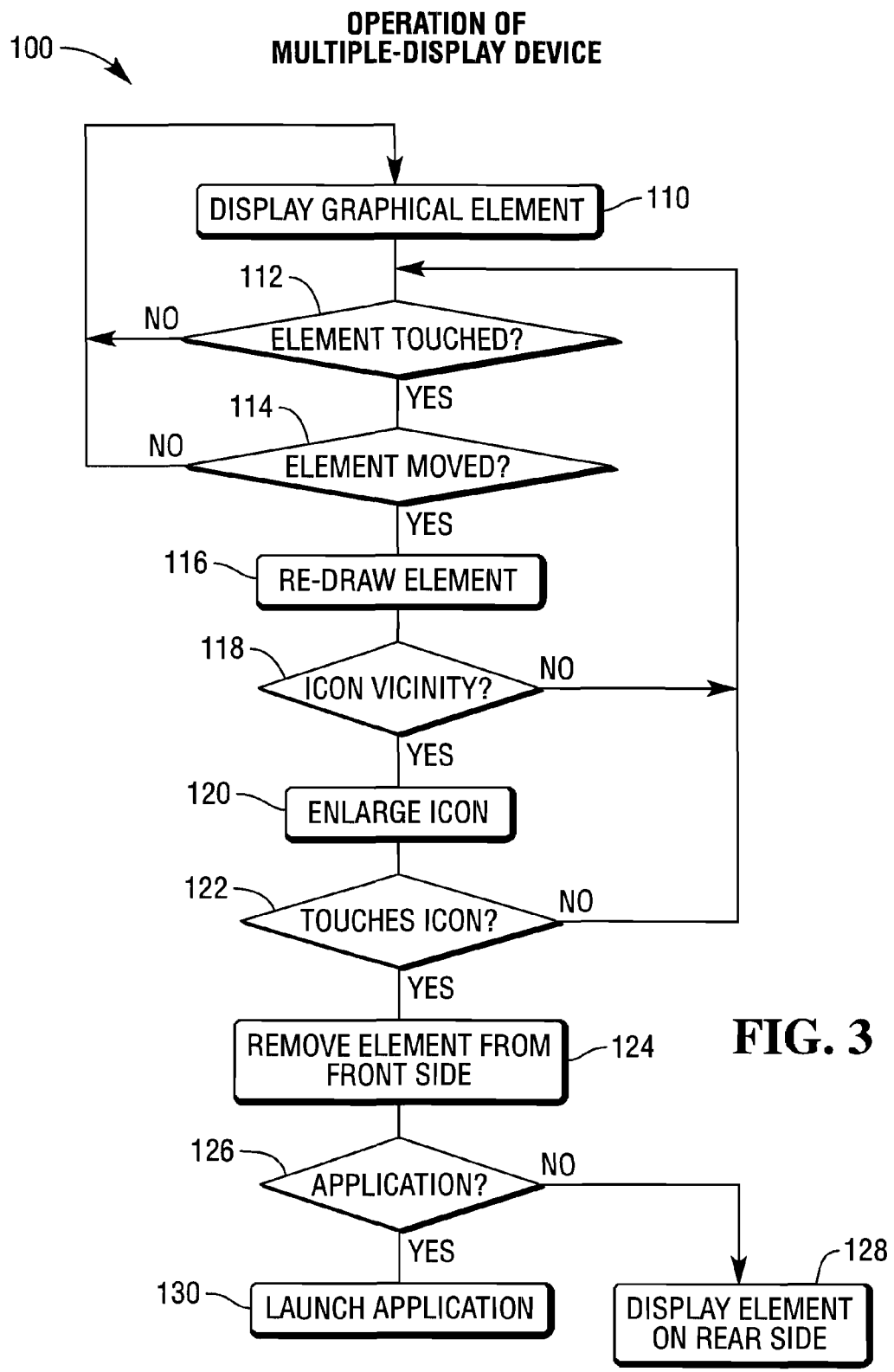
FIG. 3 is a flowchart illustrating the operation of the device of FIG. 1.

The operation of the device 10 will now be described with reference to FIG. 3, which is a flowchart 100 illustrating the operation of the device 10, and also FIGS. 4 and 5, which are pictorial views of the front image area 22 illustrating the graphical element 60 being moved towards and into (respectively) the front transfer port image 58; and also to FIGS. 6 and 7, which are pictorial views of a rear image area 70 of the device 10 illustrating the graphical element 60 emerging from a rear transfer port image; and being instantiated by the rear transfer port image.

Initially, the display controller 40 renders the graphical element 60 on the front image area 22 (step 110).

The touch panel controller 42 waits to detect a touch on either the front image area 22 or the rear image area 82 (FIGS. 6 and 7) (step 112).

If neither image area 22,82 is touched, then the display controller 40 continues displaying the graphical element 60 on the front image area 22.

In this example, the front image area 22 is touched. When this occurs, the touch panel controller 42 ascertains if the user has moved (dragged) the graphical element 60 to a different location on the front image area 22 (step 114).

If the user has not moved the graphical element 60, then the display controller 40 continues displaying the graphical element 60 on the front image area 22.

If the user has moved the graphical element 60, then the display controller 40 re-draws the graphical element 60 at its new location (step 116).

The device controller 44 then ascertains if the user has moved the graphical element 60 to the vicinity of the black hole icon 58 (step 118).

If the graphical element 60 is not in the vicinity of the black hole icon 58, then the display controller 40 waits to receive notification from the touch panel controller 42 about any new selection by the user.

Figure 4:
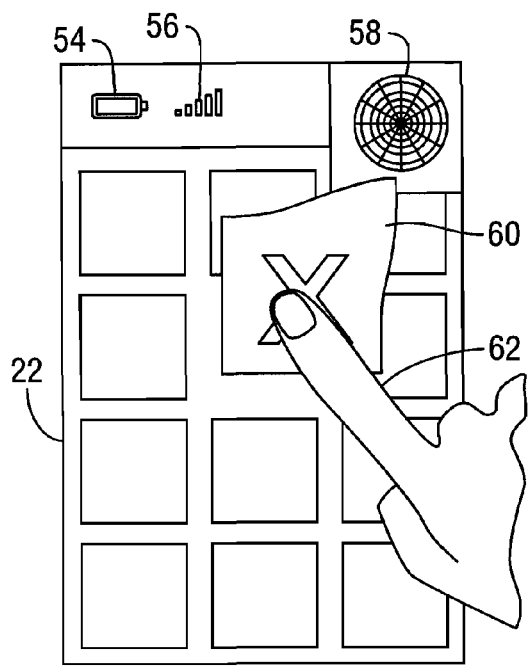
FIG. 4 is a pictorial view of the front image area of the device of FIG. 1 illustrating the rendered element being moved towards the front transfer port image.

If the graphical element 60 is now in the vicinity of the black hole icon 58, then the display controller 40 enlarges both the graphical element 60 and the black hole icon 58, as illustrated in FIG. 4 (step 120).

Figure 5:
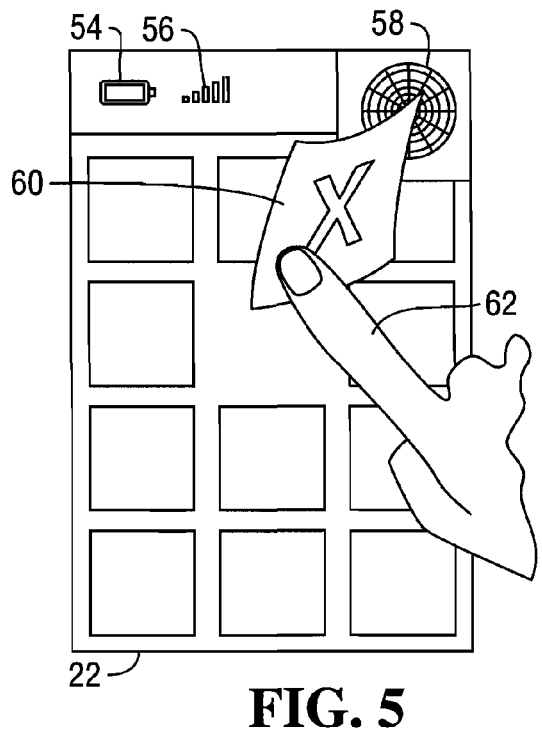
FIG. 5 is a pictorial view of the front image area of the device of FIG. 1 illustrating the rendered element entering the front transfer port image.

The touch panel controller 42 then ascertains if the graphical element 60 touches the black hole icon 58, as illustrated in FIG. 5.

If the graphical element 60 is not touching the black hole icon 58, then the display controller 40 waits to receive notification from the touch panel controller 42 about any new selection by the user.

If the graphical element 60 is touching the black hole icon 58, then the device controller 44 instructs the display controller 42 to stop displaying the graphical element 60 on the front image area 22 (step 124). This may be implemented by immediately removing the graphical element 60, by fading out the graphical element 60, by shrinking the graphical element to zero size over the black hole icon 58, or in any other convenient manner.

The device controller 44 then ascertains if the graphical element 60 is an icon representing an executable file, or merely an icon representing data, or a text string (step 126).

Figure 6:
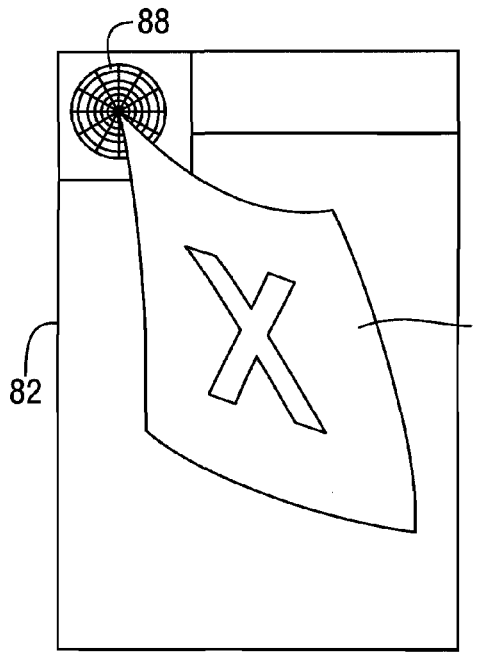
FIG. 6 is a pictorial view of a rear image area of the device of FIG. 1 illustrating a rendered element emerging from a rear transfer port image.
Figure 7:
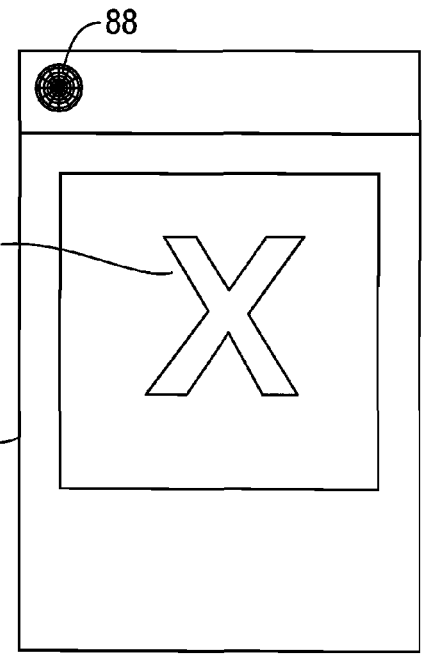
FIG. 7 is a pictorial view of the rear image area of the device of FIG. 1 illustrating the rendered element being instantiated by the rear transfer port image.

If the graphical element 60 is not an icon representing an executable file, then the device controller 44 instructs the display controller 40 to render the graphical element 60 on the rear image area 82 (step 128), as illustrated in FIGS. 6 and 7.

If the graphical element 60 is an icon representing an executable file, then the device controller 44 launches the executable file (step 130), and instructs the display controller 40 to render images on the rear image area 82 resulting from launching the executable file.

Various modifications may be made to the above described embodiment within the scope of the invention, for example, the device controller 44 may only instruct the display controller 40 to launch the executable file or display the icon once the accelerometer 46 detects that the user has flipped the device 10 over so that the rear display is now facing the front.

In other embodiments, the transfer port image may have a different appearance, location, or the like.

In other embodiments, the display controller 40 may comprise one sub-controller for each display being controlled. Similarly, the touch panel controller 42 may comprise one sub-controller for each touch panel.

In other embodiments, more than two displays may be provided on the device, for example, four or six displays may be provided.

In other embodiments, the graphical element may not be enlarged when it is moved towards the transfer port image.

In other embodiments, the transfer port image may not be enlarged when a graphical element is moved into its vicinity.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. A multiple-display device comprising:
   a front display including a front image area facing a front direction;
   a rear display mounted opposite the front display and including a rear image area facing a rear direction, opposite the front direction;
   a display controller for controlling the front and rear image areas to render images thereon, including a front transfer port image on the front image area;
   a touch-sensitive panel mounted on the front display in registration with the front image area; and
   a panel controller operable to detect a rendered element on the front image area being dragged by a user to the front transfer port image and in response thereto to inform the display controller, so that the display controller can instantiate the rendered element on the rear image area.

2. A multiple-display device according to claim 1, wherein the device further comprises third and fourth displays mounted back to back, so that the front, rear, third, and fourth displays form a square.

3. A multiple-display device according to claim 1, wherein the display controller enlarges the front transfer port image when the rendered element approaches the front transfer port image.

4. A multiple-display device according to claim 1, wherein the rear image area includes a rear transfer port image corresponding to the front transfer port image.

5. A multiple-display device according to claim 1, wherein the display controller provides a sequence of images illustrating the rendered element entering the front transfer port image, and subsequently exiting the rear transfer port image.

6. A multiple-display device according to claim 1, wherein the rear display includes a touch-sensitive panel in addition to the front display.

7. A multiple-display device according to claim 1, wherein the device further comprises an accelerometer to detect when a user flips over the device.

8. A method of operating a device comprising multiple displays, the method comprising:
   rendering a front transfer port image on a front image area of a front display;
   rendering one or more elements on the front image area;
   detecting a user selecting a rendered element and moving the selected rendered element to the front transfer port image;
   informing a display controller that the selected rendered element has been moved to the front transfer port image; and
   instantiating the selected rendered element on a rear image area of a rear display instead of on the front image area of the front display.

9. A method according to claim 8, wherein the method further comprises, subsequent to the step of detecting a user selecting a rendered element and moving the selected rendered element to the front transfer port image, the step of enlarging the front transfer port image on the front image area.

10. A method according to claim 8, wherein the method further comprises providing a rear transfer port image on the rear image area.

11. A method according to claim 8, wherein the method further comprises providing a sequence of images illustrating the selected rendered element entering the front transfer port image, and subsequently exiting the rear transfer port image.

12. A method according to claim 8, wherein the step of instantiating the selected rendered element on a rear image area of a rear display instead of on the front image area of the front display is implemented immediately when the rendered element is dragged to the front transfer port image.

13. A method according to claim 8, wherein the step of instantiating the selected rendered element on a rear image area of a rear display instead of on the front image area of the front display is implemented only when a user flips over the device.

14. A method according to claim 13, wherein detection of a user flipping over the device is implemented using an accelerometer located within the device.

15. A method according to claim 8, wherein the method further comprises:
   detecting a user selecting a rendered element on the rear image area and moving the selected rendered element to the rear transfer port image;
   informing the display controller that the selected rendered element has been moved to the rear transfer port image; and
   instantiating the selected rendered element on the front image area instead of on the rear image area.

* * * * *